United States Patent
Bondugula et al.

(10) Patent No.: US 12,314,828 B2
(45) Date of Patent: May 27, 2025

(54) VERIFICATION OF ELECTRONIC IDENTITY COMPONENTS

(71) Applicant: EQUIFAX INC., Atlanta, GA (US)

(72) Inventors: Rajkumar Bondugula, Marietta, GA (US); Piyushkumar Patel, Peachtree City, GA (US); Sunit Sivaraj, Alpharetta, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

(21) Appl. No.: 17/294,872

(22) PCT Filed: Mar. 24, 2020

(86) PCT No.: PCT/US2020/024484
§ 371 (c)(1),
(2) Date: May 18, 2021

(87) PCT Pub. No.: WO2020/198236
PCT Pub. Date: Oct. 1, 2020

(65) Prior Publication Data
US 2021/0357707 A1    Nov. 18, 2021

Related U.S. Application Data

(60) Provisional application No. 62/824,068, filed on Mar. 26, 2019.

(51) Int. Cl.
*G06N 20/20* (2019.01)
*G06F 18/20* (2023.01)
(Continued)

(52) U.S. Cl.
CPC .......... *G06N 20/20* (2019.01); *G06F 18/217* (2023.01); *G06F 18/2433* (2023.01);
(Continued)

(58) Field of Classification Search
CPC .. G06K 9/6284; G06K 9/6227; G06K 9/6262; G06N 20/00; G06N 20/10;
(Continued)

(56) References Cited

U.S. PATENT DOCUMENTS 6,336,109 B2    1/2002  Howard
10,404,723 B1 *  9/2019  Mushtaq ............. H04L 63/1425
(Continued)

OTHER PUBLICATIONS

PCT/US2020/024484, "International Search Report and Written Opinion", Jul. 9, 2020, 9 pages.
(Continued)

*Primary Examiner* — Vincent Gonzales
*Assistant Examiner* — Em N Trieu
(74) *Attorney, Agent, or Firm* — Kilpatrick Townsend & Stockton LLP (57) ABSTRACT

A unit-classification system receives a data set with identity data objects corresponding to personal identity components. Feature vectors are determined for the identity data objects. A trained classifier model determines, based on a feature vector for each identity data object, whether the corresponding personal identity components are included in a identity component ("IC") category. The unit-classification system generates an IC identification for a first IC category, and associates the IC identification with a first identity data object corresponding to a first personal identity component. The unit-classification system identifies a second identity data object corresponding to a second personal identity component included in the first IC category. The unit-classification system modifies the first and second identity data objects to include the IC identification. Responsive to a request for the IC identification, the unit-classification system can provide a response that indicates the modified first and second identity data objects.

20 Claims, 4 Drawing Sheets

(51) Int. Cl.
  *G06F 18/21* (2023.01)
  *G06F 18/2433* (2023.01)
  *G06N 5/022* (2023.01)
  *G06N 20/00* (2019.01)
  *H04L 9/40* (2022.01)

(52) U.S. Cl.
  CPC ........... *G06F 18/285* (2023.01); *G06N 5/022* (2013.01); *G06N 20/00* (2019.01); *H04L 63/102* (2013.01); *H04L 63/12* (2013.01)

(58) Field of Classification Search
  CPC ...... G06N 20/20; G06N 5/022; H04L 63/102; H04L 63/12
  USPC .......................................................... 706/20
  See application file for complete search history.

(56) References Cited

U.S. PATENT DOCUMENTS

| | | | | |
|---|---|---|---|---|
| 2002/0130176 A1* | 9/2002 | Suzuki | ..................... | H04W 4/02 |
| | | | | 235/380 |
| 2004/0243812 A1* | 12/2004 | Yui | ..................... | G07C 9/00563 |
| | | | | 713/182 |
| 2006/0149674 A1* | 7/2006 | Cook | ..................... | G06Q 40/02 |
| | | | | 705/44 |
| 2011/0302067 A1* | 12/2011 | Washington | ........... | G06Q 20/40 |
| | | | | 705/34 |
| 2012/0109821 A1* | 5/2012 | Barbour | ................. | G06Q 40/02 |
| | | | | 705/44 |
| 2012/0303558 A1* | 11/2012 | Jaiswal | ................... | G06N 20/00 |
| | | | | 706/12 |
| 2017/0270526 A1 | 9/2017 | Fitzgerald | | |
| 2018/0359223 A1 | 12/2018 | Maier et al. | | |
| 2019/0066248 A1* | 2/2019 | McEachern | .......... | G06Q 40/123 |

OTHER PUBLICATIONS

Australian Patent Application No. 2020245462, "First Examination Report", Oct. 6, 2021, 2 pages.
International Application No. PCT/US2020/024484, "International Preliminary Report on Patentability", Oct. 7, 2021, 6 pages.
AU2020245462, "Notice of Acceptance", Mar. 9, 2022, 3 pages.
CA3,134,595, "Office Action", May 13, 2022, 5 pages.
Canadian Patent Application No. 3,134,595, "Office Action", Dec. 1, 2022, 4 pages.
AU2022204452, "First Examination Report", Mar. 16, 2023, 2 pages.
CA3,134,595, "Notice of Allowance", May 1, 2023, 1 page.

* cited by examiner

VERIFICATION OF ELECTRONIC IDENTITY COMPONENTS

RELATED APPLICATIONS

The present disclosure claims priority to U.S. Provisional Application Ser. No. 62/824,068, filed Mar. 26, 2019, which is incorporated by reference herein in its entirety.

TECHNICAL FIELD

This disclosure relates generally to the field of machine learning, and more specifically relates to machine-learning techniques for accurate classification of electronic data components for identities.

BACKGROUND

A person's electronic persona may be based on data components for the person's identity. For example, a person may create an electronic identity based on his or her name, telephone number, and address. The person may use the electronic identity to access electronic resources, such as an online account to manage electronic storage or utilities.

However, defects in identity data components can present difficulties with respect to online services or other resources. For instance, identity data components may be vulnerable to fraudulent use. In one example, a malicious actor may modify genuine identity data to create a fictitious electronic persona. The fictitious electronic persona could be used to gain illicit access to the electronic resources, such as by creating an account using the fictitious persona. Fictitious personas, also called synthetic personas, may be difficult to identify and neutralize, as they can use modified identity data components that closely resemble genuine identity components, such as a misspelled name or a partial address.

SUMMARY

According to certain implementations, a unit-classification system can receive an identity component ("IC") data set that includes multiple identity data objects. Each of the multiple identity data objects can correspond to an personal identity component. The unit-classification system can determine feature vectors of the multiple identity data objects. A feature vector for a respective identity data object can indicate extracted features of the respective identity data object. The unit-classification system can include a classifier model that is trained based on the feature vectors. The training can include generating a one-class classifier configured to determine, based on a feature vector for a respective identity data object, that the respective identity data object corresponds to a respective personal identity component. The unit-classification system can generate an IC identification that corresponds to a first IC category indicated by the one-class classifier. The IC identification can be associated with a first identity data object corresponding to a first personal identity component. The unit-classification system can identify a second identity data object corresponding to a second personal identity component, based on the second personal identity component being included in the first IC category. The unit-classification system can modify the first identity data object and the second identity data object to include the IC identification. Responsive to a request for the IC identification, the unit-classification system can provide a response to a requesting computing system. The response can indicate the modified first identity data object and the modified second identity data object. The requesting computing system can be configured to verify one or more components in an electronic persona based on the response.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Certain aspects described herein involve machine-learning techniques for accurate classification of electronic data components for identities. For example, an electronic persona for a person can be formed from identity data components. The electronic persona may be created based on, for example, a given name (e.g., legal name, family name), a telephone number, a personal identification number (e.g., an employee number, a Social Security Number), or other identity data that indicates aspects of the person's identity. In some cases, the electronic persona can be used to access electronic resources or other resources. For instance, using the electronic persona, the person may create an online account by which he or she accesses electronic resources, utilities, subsidized services, or other types of resources or services. However, identity data components can be modified or used fraudulently. For example, a malicious actor that wishes to gain illicit access to a resource may create a synthetic electronic persona. In some cases, the synthetic electronic persona can be based on modifications of identity data components, such as a slight variation of a person's name or address. In addition, the synthetic electronic persona can be based on repurposed identity data components, such as a name from a first person combined with an address of a second person. A synthetic electronic persona can be difficult to detect, such as if it uses genuine identity data that is modified by subtle variations. In some cases, the malicious actor can use the synthetic electronic persona to illicitly access electronic resources, services, tangible resources (e.g., a home utility), an online account, or other types of resources or services.

A unit-classification system can be used to classify an identity data component, such as during a verification process. Identity data components can include (without limitation) user identification ("user IDs"), personal names (e.g., given names, family names), IP addresses, geographical addresses, telephone numbers, or other data that indicates a personal characteristic that identify (or partially identify) a person. In some cases, the identity data components can include personally identifiable information ("PII") or other data that is considered private or protected.

The unit-classification system can analyze a set of data objects that represent identity components. For instance, each identity data object can correspond to a personal identity component ("IC"), such as identity data objects indicating user names, addresses, or other personal ICs. The unit-classification system can determine features of each identity data object. In addition, the unit-classification system can include a classifier that is trained to determine an IC category for each identity data object, based on the features for the respective data object. The IC category can indicate a group that includes one or more of the personal ICs represented by the identity data objects. As a non-limiting example, the unit-classification system can determine whether a personal IC indicating a user name belongs to an IC category for "administrator" or "user," based on features of the corresponding identity data object. As an additional non-limiting example, the unit-classification system can determine whether a personal IC indicating a geographical address belongs to an IC category for "multi-dwelling residence" or "single-family residence," based on features of the corresponding identity data object.

Based on output from the classifier, the unit-classification system can generate an IC identification indicating the IC category. In addition, the unit-classification system can modify one or more identity data objects to include the IC identification. For example, if the classifier determines that a first identity data object and a second identity data object each are included in a particular IC category indicating "user" (e.g., for user name personal ICs), the unit-classification system can modify the first and second identity data objects to include the particular IC category. In addition, the unit-classification system can provide a classification response to an additional computing system. For instance, the classification response can indicate a "user" IC category for the first and second identity data objects. In some cases, the additional computing system can use the classification response to verify an electronic persona, such as an electronic persona that has requested administrator privileges for an online account. In some implementations, accurate classification of an identity data component can improve detection of a synthetic electronic persona. Improved detection of synthetic electronic personas, or other misuses of identity data, can reduce fraudulent access to electronic and tangible resources or services. In addition, improved classification of identity data components can reduce expenditure of computing resources, such as by identifying and potentially neutralizing resource use that is caused by accounts based on synthetic personas.

Understanding which identity components are included in which IC categories can allow for better verification of electronic personas. In addition, identification of IC categories can improve detection of some types of fraud, such as fraudulent acquisition of resources of services based on fictitious or synthetic electronic personas.

In some cases, accurate categorization of identity components can provide for improved resource allocation, such as efficient allocation of computing resources based on characteristics of electronic personas. In addition, accurate categorization of identity components can improve efficiency of resource expenditures, such as determining efficient deployment of an infrastructure resource (e.g., telecommunications, community services) for a group of geographical addresses. Certain aspects described herein involve a unit-classification system, in which a computing system executes a software-implemented classifier that can predict if a given personal identity component belongs to an IC category using machine learning algorithms and various data repositories describing personal identity components (e.g., databases containing identity data objects).

Various aspects include features enabling the classification of identity data objects using expert systems and machine learning models. In a non-limiting example, the unit-classification system can access one or more databases or other data structures having identity component data. An example of such a data structure can include a database of user information (e.g., user ID, age, given name) for a group of online accounts. In some aspects, the unit-classification system can improve identification of fraudulent identity components, as well as improving resource allocation.

Various aspects of the present disclosure may include applying a selected data set to a machine-learning model, such as during training of the machine-learning model, to obtain a set of expert rules, scoring models or other machine learning model representations. A unit-classification system can be applied to identity data objects having structured data, unstructured data, or both. The result of the application of the data set to the machine-learning model can be an expert system that provides rules for scoring or otherwise classifying personal ICs. A waterfall structure classifier model may use the expert system's scoring model to classify feature vectors including features of identity data objects that correspond to personal ICs. For instance, the classifier model can include one or more one-class classifiers capable of determining if a particular identity data object belongs to 1) a first IC category, 2) a second IC category, or 3) an unknown category. The waterfall structure classifier model affirmatively identifies not only identity data objects that belong to the first or second IC categories, but also identity data objects that do not match the expert system's scoring model. For instance, rather than defaulting to the second IC category if a particular data object (e.g., indicating a personal IC) does not satisfy rules that would result in the first IC category, the waterfall structure classifier model applies one or more additional rules to distinguish between the second IC category and an "unknown" classification. This feature enables items with the "unknown" classification to be further analyzed and, in some cases, manually identified by an end user.

In some implementations, a unit-classification system can enable fraud detection by identifying identity data objects in a particular IC category. The various aspects can improve fraud detection or other applications, such as by identifying synthetic electronic personas incorporating modified personal identity components that are altered, ambiguous, incomplete, or otherwise modified from genuine personal identity components.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Unit-Classification System

In some implementations, a unit-classification system can utilize a computing environment that includes one or more of a data exploration and analytics environment, machine learning methods, or data sets to create a scoring model. In various aspects, the data sets can include, but are not limited to, data describing account data (e.g., user IDs, account options), data describing personal names (e.g., given names, family names), data describing computing information (e.g., IP addresses, device type), data describing geographical addresses (e.g., residential addresses, business addresses), or any other suitable data set describing personal ICs. These data sets can be analyzed in an exploration-and-analytics environment to build an expert system that provides a scoring model in the form of one or more rules.

Various aspects include a unit-classification system that analyzes identity data objects and classifies the identity data objects as likely belonging to (or being excluded from) one or more IC categories. Different options can be used for one or more of classifying identity data objects that are (or are not) likely to belong to an IC category, identifying partial signals that indicate an identity data object is potentially part of an IC category, identifying additional personal ICs associated with an identity data object, or scoring each identity data object to assess whether the data object belongs to an IC category. An algorithm executed by the unit-classification system can be validated on identity data components with known IC categories.

Figure 1:
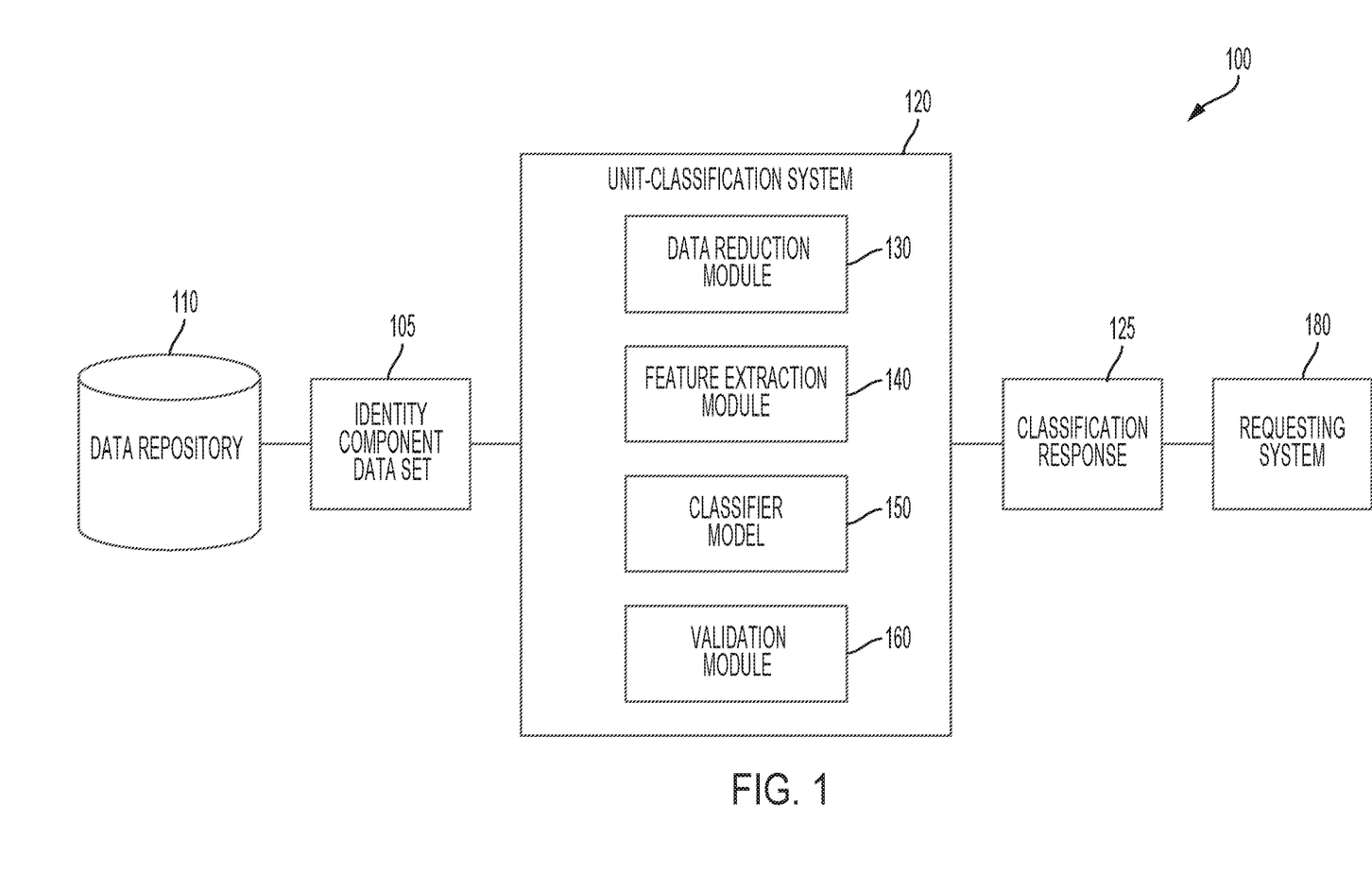
FIG. 1 is a diagram depicting an example of a computing environment in which a unit-classification system may classify one or more identity data objects, according to certain implementations.

FIG. 1 depicts a diagram of a computing environment 100 in which a unit-classification system 120 may classify one or more identity data objects. The unit-classification system 120 can receive an IC data set 105. For example, the IC data set 105 can be received from one or more data sources, such as a data repository 110. In some implementations, the IC data set 105 includes one or more identity data objects that indicate components of personal identity data. Non-limiting examples of an identity data object include a database record, text data, image data, or other suitable data objects that can indicate personal identity data.

In some cases, the identity data objects can correspond to residential dwellings that are located at an indicated addresses. For example, each identity data object can indicate the address of a corresponding dwelling. In some cases, the IC data set 105 can include additional data objects with address data that does not indicate residential dwellings. For instance, the data set 105 could include identity data objects corresponding to addresses of businesses, empty lots (e.g., unbuilt), rural routes, postal boxes, or other non-residential locations. In some implementations, the unit-classification system 120 can include a data reduction module 130. The data reduction module 130 may modify the IC data set 105. For example, if the IC data set 105 includes identity data objects with address data, the data reduction module may remove additional data objects indicating non-residential locations. In some cases, the data reduction module 130 may modify the IC data set 105 by removing data objects that indicate one or more error codes, such as address data or other identity data that is flagged as incorrect.

The unit-classification system 120 may determine one or more features for identity data objects in the data set 105. For instance, the unit-classification system 120 can include a feature extraction module 140. The feature extraction module 140 can analyze one or more of the identity data objects to determine features of the identity data objects. For example, the feature extraction module 140 may extract features of a particular identity data object, indicating one or more characteristics of the particular identity data object. In addition, the feature extraction module 140 may extract features of a particular group of identity data objects, indicating one or more shared characteristics of the particular group. A non-limiting example of a feature for a particular identity data object is whether the particular data object includes an "apartment" text indicator. A non-limiting example of a shared feature for a group of identity data objects is whether the group includes a pattern, such as telephone numbers that begin with three identical numerals (e.g., an area code, an exchange). Additional examples of features are provided below.

In some implementations, the unit-classification system 120 includes one or more classifier models, such as a classifier model 150. The classifier model is trained to classify an identity data object based on a features vector associated with the identity data object. In some cases, the classifier model 150 is trained to determine whether the identity data object corresponds to a first IC category. As a non-limiting example, the classifier model 150 may include a first one-class classifier that is trained to determine that an identity data object corresponds to an addressed residential dwelling that is included in a multi-dwelling unit ("MDU"), such as an apartment building. In addition, the classifier model 150 may include a second one-class classifier that is trained to determine that an identity data object corresponds to a second IC category. As another non-limiting example, the classifier model 150 may include a second one-class classifier that is trained to determine that an identity data object corresponds to an addressed residential dwelling that is excluded from an MDU, such as a single-family residence or other non-MDU dwelling.

In some cases, the classifier model 150 may be trained based on the IC data set 105. For instance, the data set 105 can have at least a portion of personal IC data removed from the identity data objects. As a non-limiting example, a training data set that includes name data objects could have family names removed from some or all of the training data objects. In some cases, a training data set can include labels indicating an IC category to which a training data object corresponds. As another non-limiting example, a training data set that includes address data objects could include labels indicating whether address data for a particular data object is included in an MDU (or to non-MDU) dwellings. In some cases, a validation module 160 is included in the unit-classification system 120. The validation module 160 can validate classifications generated by the classifier model 150, such as by comparing a classification of a particular training data object to a label of the particular training data object.

Based on an indication from the trained classifier model 150, the unit-classification system 120 can generate at least one IC identification for the identity data objects. The IC identification can be associated with a particular IC category that corresponds to a personal IC in at least one of the identity data objects. In some cases, the unit-classification system 120 can identify multiple identity data objects that are associated with a particular IC identification. As a non-limiting example, a first identity data object, with address data corresponding to a first residential dwelling, could be associated with a first IC identification that indicates a location of an MDU that includes the first residential dwelling. Continuing with this example, the unit-classification system 120 could identify a second identity data object, with address data corresponding to a second residential dwelling, that is associated with the first IC identification, responsive to determining that the second residential dwelling is included in the MDU of the first residential dwelling. In some cases, the ach group of data objects that are included in a particular IC category. In the above example, the unit-classification system 120 could identify a respective IC identification corresponding to MDU of the first and second residential dwellings.

In some implementations, the unit-classification system 120 can provide one or more of classifications or IC identifications to an additional computing system. For example, the unit-classification system 120 may receive a request, from a requesting computing system 180, for IC categories of a group of personal ICs (e.g., indicated by part or all of the IC data set 105). Responsive to the request, the unit-classification system 120 may generate an classification response 125. The classification response 125 may indicate one or more IC categories for personal ICs indicated by the request, As a non-limiting example, the classification response 125 could indicate whether an identity data object includes address data that is categorized as an MDU or non-MDU dwelling. In addition, the classification response 125 may indicate one or more IC identifications of personal ICs indicated by the request. The unit-classification system 120 may provide the generated classification response 125 to the requesting system 180. In some implementations, one or more of the unit-classification system 120, the data repository 110, or the requesting system 180 communicate via a computing network, such as a communications network configured to transfer data among computing systems.

Examples Involving Identity Component Identification and Mapping

In some cases, a unit-classification system can be used to verify specific types of identity data objects, such as address data objects that include geographic address data. Verifying an address data object can include classifying the address data object as a category of address, such as a multi-dwelling residential address, a single-family residential address, a commercial address, an unbuilt address (e.g., undeveloped property lots, property zoned for agricultural purposes, national parkland), or other suitable categories indicating an IC category of the address data.

A multi-dwelling unit, also known as a multifamily residential unit, is a housing classification in which multiple separate housing units for residential inhabitants are contained within one physical building or several buildings within one complex. Understanding which residential addresses are included in MDUs can improve detection of some types of fraud, such as fraudulent acquisition of services based on fictitious or incomplete addresses. In addition, better identification of MDUs can allow better assessment of efficient resource allocation, such as determining where to install infrastructure or maximizing use of existing infrastructure. Infrastructure resources can include telecommunications (e.g., fiber optic cable, mobile network coverage), community services (e.g., school system density, health services availability), or other types of infrastructure.

Certain aspects described herein involve a unit-classification system, in which a computing system executes a software-implemented classifier that can predict if a given address belongs to an MDU using machine learning algorithms and various data assets describing entities (e.g., databases containing geographic addresses).

Various aspects include features enabling the classification of multi-dwelling units using a classifier model, such as the classifier model 150. MDUs are buildings that host multiple entities (e.g., different families, different businesses), such as apartments, condos, townhouses, office buildings with multiple suites, etc. In a non-limiting example, a unit-classification system, such as the unit-classification system 120, can access one or more databases or other data structures having entity data. In various aspects, the data sets can include, but are not limited to, a database indicating standardized addresses, such as standardized address data from the United States Postal System ("USPS"), a database including credit reporting data, a database indicating property data, a database indicating trades (e.g., mortgage trades), a database indicating National Consumer Telecom and Utilities Exchange ("NCTUE") data, a database indicating marketing system addresses, or any other suitable data set indicating address data. In this example, for every address in a set of addresses stored in a database, the unit classification system can assign a prediction score from 0 to 1. The score can indicates the likelihood of whether the address belongs to a multi-dwelling unit. If an address belongs to an MDU, the score will be closer to 1 and also has a system generated MDU identifier ("MDU-ID"). In some aspects, the unit-classification system can improve identification of fraudulent address data, as well as improving infrastructure expenditure planning or determining more efficient application of existing infrastructure assets.

Various aspects of the present disclosure may include applying a selected address data set to a machine-learning model, such as during training of the machine-learning model. The result of the application of the address data set to the machine-learning model can be an expert system that provides rules for scoring or otherwise classifying multi-dwelling and single-family residences. For example, the described waterfall structure classifier model may use the expert system's scoring model to classify feature vectors including features of address data as being either 1) an MDU, 2) a non-MDU, or 3) an "unknown" type of address. Thus, the waterfall structure classifier model affirmatively identifies not only MDUs, but also dwellings that do not match the expert system's scoring model. For instance, rather than defaulting to a "non-MDU" classification if a particular data object (e.g., indicating an address) does not satisfy rules that would result in an "MDU" classification, the waterfall structure classifier model applies one or more additional rules to distinguish between a "non-MDU" classification and an "unknown" classification. This feature enables items with the "unknown" classification to be further analyzed and, in some cases, manually identified by an end user.

A unit-classification system can be applied to data objects having structured data, unstructured data, or both. The data objects can describe location data of, for example, buildings or property. In one example, the unit-classification system can be applied to a data object that includes text describing a geographical address to be classified. In another example, the unit-classification system can be applied to a data object that includes satellite imagery depicting one or more buildings to be classified. In some cases, the unit-classification system can be applied to one or more data objects that are provided or verified by a governmental organization, such as a postal database record. For example, address data can be provided or verified by the USPS or another suitable governmental organization, including additional postal systems organized by additional national governments. In addition, one or more unit-classification systems can be applied to data objects indicating addresses (or other location data) that are within a particular nation, state, province, municipality, or other governmental jurisdiction. For instance, a first unit-classification system can be trained to classify addresses within the United States, such as based on Zip Code data or Zip+4 data. In addition, a second unit-classification system can be trained to classify addresses within Canada, such as based on Postal Code data.

In some implementations, dwellings identified by the unit-classification system may be mapped to a visual image such as a neighborhood map. Such a feature can provide a visual indicia of MDUs and single-family dwellings.

In some implementations, a unit-classification system can enable fraud detection by identifying dwellings that are not MDUs, but for which there may be many addresses, such as mail or packaging stores. The various aspects can improve fraud detection or other applications, such as by identifying fictitious addresses, synthetic IDs, ambiguous addresses, incomplete addresses, or other improper address information.

Figure 2:
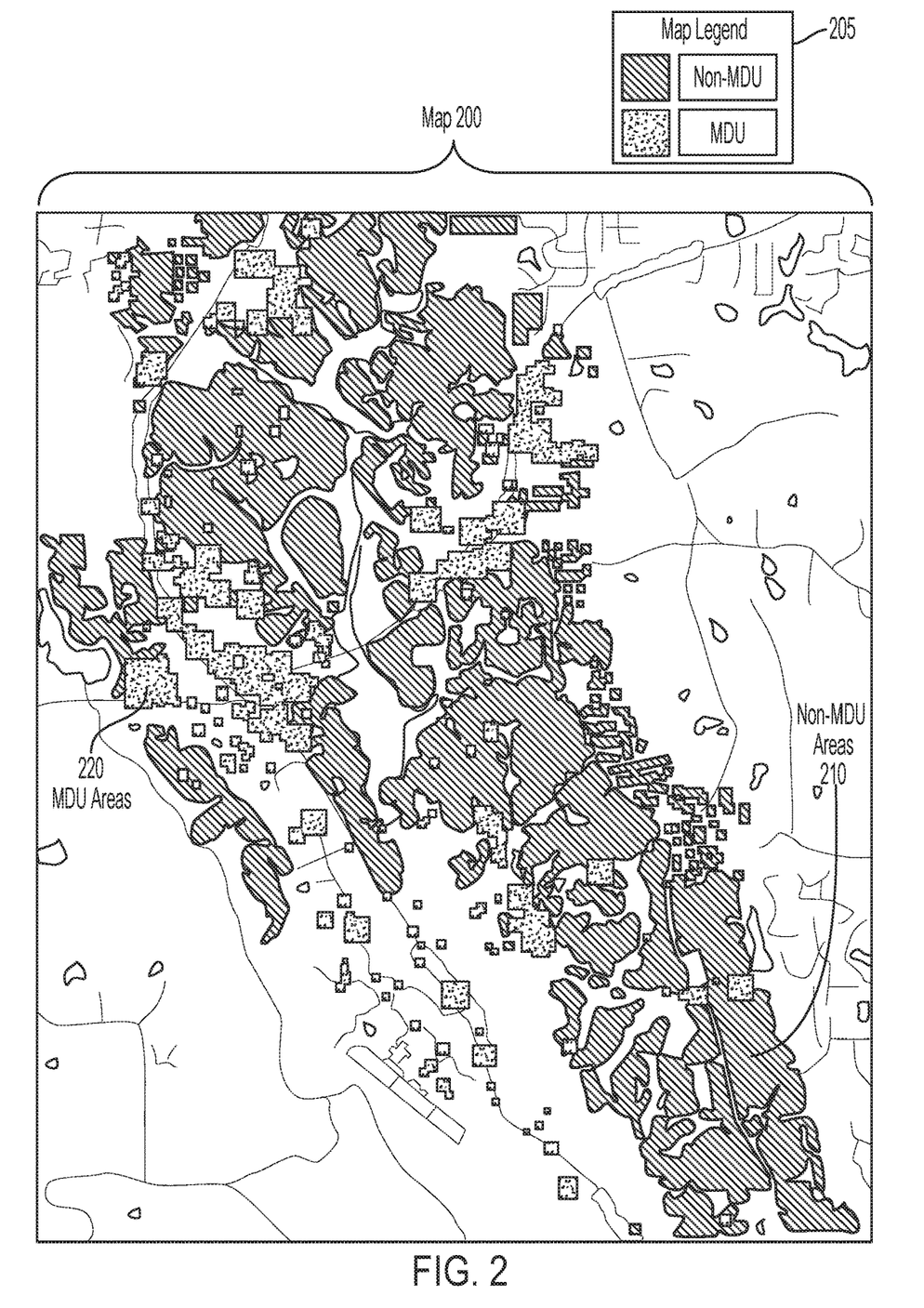
FIG. 2 is a diagram depicting examples of different types of address data that can be included within identity data objects, according to certain implementations.

FIG. 2 is a diagram depicting examples of different types of address data that can be included within identity data objects. In FIG. 2, a map 200 depicts MDU and non-MDU units in a geographic region, with areas 210 indicating non-MDU addresses and areas 220 indicating MDU addresses. For convenience, and not by way of limitation, a map legend 205 indicates visual patterns associated with the non-MDU areas 210 and MDU areas 220, but other representations of addresses are possible, including representations not intended for human interpretation. The example of the map 200 is generated using various aspects of a unit-classification systems described within the present disclosure. A unit-classification system as described herein can identify MDUs from addresses appearing in a dataset, such as addresses in headers of data objects from a credit reporting data repository, property data, or any other database or any file(s) containing addresses.

In one example, improved MDU classification capability can be useful in generating service models that are specifically targeted towards MDU-specific populations. For example, this capability can be useful for a cost-benefit analysis of infrastructure expenditures, such as laying fiber optic cables, in areas with a high density of MDUs.

In various aspects, a unit-classification system can analyze and classify multiple types of address. A first type of address that can be analyzed and classified by the unit-classification system can include an explicit indicator for a MDU in the address, such as "APT" or another suitable indicator. As a non-limiting example, an address such as "1036 Lakeside Drive, APT 16" can explicitly indicate an MDU dwelling, such as by the inclusion of the information "APT 16." As another non-limiting example, an address such as "1036-D Lakeside Drive" can explicitly indicate an MDU, such as by the inclusion of the information "-D." Examples of explicit MDU indicators can include (without limitation) data describing an apartment, a suite, a unit, a directional (e.g., NW, East), a building (e.g., townhome, condominium), a secondary range (e.g., 18A through 18D), or other types of explicit indicators.

In another aspect, a second type of address that can be analyzed and classified by the unit-classification system can be an address in which there is no explicit indicator identifying if the address is for an MDU. As a non-limiting example, an address such as 1227 Lakeside Drive can identify an MDU while omitting an explicit indication of an MDU. As another non-limiting example, an address such as 8271 Champion Trail can identify a non-MDU while omitting an explicit indication of an MDU. Addresses that belong to the second type may be difficult to classify as they cannot be easily distinguished from addresses for single-family homes.

Various aspects of the present disclosure include a unit-classification system implementing machine-learning techniques. In a non-limiting example, an address can include a unit number or apartment number (e.g., 1205 University Ave, Apt 201). The unit number or apartment number can be an explicit indication identifying if the addressed dwelling is a part of a physical building of an MDU. For example, an MDU might contain multiple physical buildings. In another non-limiting example, an address contains a unit number or apartment number as a suffix in the street number portion of the address (ex: 1205-201 University Ave). In yet another non-limiting example, each dwelling in a MDU gets an address with a different street number (120520 University Ave).

The following non-limiting example illustrates how the unit-classification system can classify one or more addresses as belonging to one or more MDUs. The unit-classification system can include software that is programmed to perform operations described in this example. In this example, a plurality of addresses from suitable data sources are put through a suitable address standardization process. In some cases, addresses with error codes are discarded from the data set. In addition, addresses that belong to lots, post offices, postal boxes, military installations, rural routes, rural highways, and governmental territories can be discarded from the data set. For example, one or more of the following data objects may be removed from the data set: addresses with error codes; lost addresses; post office addresses; postal box addresses; military addresses; rural routes; rural highway contract; or US territories (e.g., PR, GU, VI, AE, AA, AP, MP, AS, FM, PW, MH).

In some cases, unstructured data fields in property data can be standardized during an address standardization process. Standard unit designators, such as unique codes, may be applied to one or more unstructured data fields. Unit designator codes can include (without limitation) residential codes or commercial codes. Some non-limiting examples of residential codes include APT, UNIT, TRLR, RM, REAR, PH, BSMT, NO, AP, UNT, -, #, APTS, or other residential codes represented by alphanumeric text or text symbols. Some non-limiting examples of commercial codes include FL, STE, SPC, BLDG, SP, OFC, LBBY, SPACE, or other commercial codes represented by alphanumeric text or text symbols.

In some cases, property data description classifications may be applied to one or more unstructured data fields during an address standardization process. The classifications can include free-form text, such as text entered into a free-form text field. In some cases, property data description classifications may have tens of thousands of variations. As a non-limiting example, a data set that includes 21,406 variations of property data description classifications can include greater than 900 variations for Condominium (e.g., Condo, Condo Apt w. Elevators), greater than 400 variations for Townhome (e.g., Townhome, Townhouse, Townhouse 2-Story), greater than 5000 variations for Single-Family Home (e.g., Single Family Residential, 1-Family Residence, 1-Family Year-round Residence), and other free-form text variations of property data description classifications.

In some cases, latitude and/or longitude data may be removed from unstructured data fields during an address standardization process. For example, latitude or longitude data can be removed from an address, such as similar latitude/longitudes designators multiple streets for addresses, incorrect values (e.g., value of 0.0), values for virtual mail boxes, or other types of latitude or longitude data.

In some implementations, one or more of unit designators, property data description classifications, latitude/longitude, or other suitable designations may be insufficient to properly classify MDU and non-MDU addresses. In one example, approximately one-third of addresses may lack explicit indicators in the data.

In some cases, the unit-classification system receives input data, such as standardized address data (e.g., standardized via an address standardization process) or other suitable input data indicating one or more buildings or properties. The input data can be further analyzed with a unit classifier. Data objects (e.g., standardized address data, unstructured address data, unstructured data including images depicting buildings) can be encoded into or otherwise represented as feature vectors. As a non-limiting example, a feature vector can represent standardized address data. The feature vector can include, for instance, approximately 100 features that are extracted from standardized address, property data records, property data descriptions, latitudes and longitude data at one or more levels (e.g., property level, street level, zip code level), or other suitable address data or location data from which features may be extracted.

In some cases, extracted features can include one or more of address features, postal code features, street features, latitude/longitude features, number pattern features, or any other suitable feature type that describes a characteristic of a group of addresses. Non-limiting examples of address features include a quantity of addresses in a geographical area, quantity of addresses with a secondary range, quantity of addresses with a primary range and without a secondary range, quantity of addresses with residential unit designator codes (e.g., APT, UNIT), percentage of addresses with residential unit designator codes, quantity of addresses with commercial unit designator codes (e.g., STE, BLDG), percentage of addresses with commercial unit designator codes, quantity of addresses with a high-rise or apartment indicator (e.g., indicated by USPS address data), percentage of addresses with a high-rise or apartment indicator, quantity of addresses that are within a property (e.g., multiple dwellings on a particular parcel of land), percentage of addresses that are within a property, quantity of addresses within a property that are MDU (e.g., condominiums, townhomes, mobile homes), percentage of addresses within a property that are MDU, quantity of addresses included in a commercial marketing database, or other suitable address features.

In some cases, extracted postal code features can be determined based on a geographic area that is designated by a governmental addressing system, such as (without limitation) a Zip Code or Zip+4 data that are designated by the USPS. Non-limiting examples of postal code features include a quantity of addresses in a geographic area at postal code level (e.g., within an area designated by a Zip+4 Code or other postal code), quantity of addresses with a secondary range at postal code level, quantity of addresses with a primary range and without a secondary range at postal code level, quantity of addresses with residential unit designator codes at postal code level, percentage of addresses with residential unit designator codes at postal code level, quantity of addresses with commercial unit designator codes at postal code level, percentage of addresses with commercial unit designator codes at postal code level, quantity of addresses with a high-rise or apartment indicator at postal code level, percentage of addresses with a high-rise or apartment indicator at postal code level, quantity of addresses that are within a property at postal code level, percentage of addresses that are within a property at postal code level, quantity of addresses within a property that are MDU at postal code level, percentage of addresses within a property that are MDU at postal code level, quantity of addresses included in a commercial marketing database at postal code level, or other suitable postal code features.

In some cases, extracted street features can be determined based on a geographic area that is designated by a street name. Non-limiting examples of street features include a quantity of addresses in a geographic area at street level (e.g., within an area designated by a street name), quantity of addresses with unit designator codes found at street level, quantity of addresses with a secondary range at street level, quantity of addresses with a primary range and without a secondary range at street level, quantity of addresses with residential unit designator codes at street level, percentage of addresses with residential unit designator codes at street level, quantity of addresses with commercial unit designator codes at street level, percentage of addresses with commercial unit designator codes at street level, quantity of addresses with a high-rise or apartment indicator at street level, percentage of addresses with a high-rise or apartment indicator at street level, quantity of addresses that are within a property at street level, percentage of addresses that are within a property at street level, quantity of addresses within a property that are MDU at street level, percentage of addresses within a property that are MDU at street level, quantity of addresses included in a commercial marketing database at street level, or other suitable street features.

In some cases, extracted latitude/longitude features can be determined based on a geographic area that is designated by a latitude/longitude, or a range of latitudes/longitudes. In addition, latitude/longitude features can be extracted based on one or more latitude values or longitude values having a precision of 4 decimal places (e.g., accurate within 11 meters), 3 decimal places, e.g., accurate within 111 meters), or another suitable precision. Non-limiting examples of latitude/longitude features include a quantity of addresses in a geographic area at latitude/longitude level (e.g., within an area designated by a latitude/longitude or range of latitudes/longitudes), quantity of addresses with a secondary range at latitude/longitude level, quantity of addresses with a primary range and without a secondary range at latitude/longitude level, quantity of addresses with residential unit designator codes at latitude/longitude level, percentage of addresses with residential unit designator codes at latitude/longitude level, quantity of addresses with commercial unit designator codes at latitude/longitude level, percentage of addresses with commercial unit designator codes at latitude/longitude level, quantity of addresses with a high-rise or apartment indicator at latitude/longitude level, percentage of addresses with a high-rise or apartment indicator at latitude/longitude level, quantity of addresses that are within a property at latitude/longitude level, percentage of addresses that are within a property at latitude/longitude level, quantity of addresses within a property that are MDU at latitude/longitude level, percentage of addresses within a property that are MDU at latitude/longitude level, quantity of addresses within a property that are non-MDU at latitude/longitude level, percentage of addresses within a property that are non-MDU at latitude/longitude level, quantity of addresses included in a commercial marketing database at latitude/longitude level, or other suitable latitude/longitude features.

In some cases, extracted number pattern features can be determined based on data indicating a primary range or secondary range (or both) of a group of addresses within a geographic area, such as an area that is designated by a street name. For example, a number pattern feature could be determined based on a pattern of numbers that is present on a street (e.g., odd numbers on one side and even numbers on another side, numbers that increment by 5 or by 10). Non-limiting examples of number pattern features include a quantity of addresses having a primary range of three or more digits (e.g., 5010 Claremont St, 5020 Claremont St, 5030 Claremont St), percentage of addresses having a primary range of three or more digits (e.g., 5010 Claremont St, 5020 Claremont St, 5030 Claremont St), quantity of addresses having a matching primary range of three or more digits (e.g., 5012 Claremont St, 5014 Claremont St, 5016 Claremont St), percentage of addresses having a matching primary range of three or more digits, or other suitable number pattern features.

In some implementations, unit-classification system includes one or more classifier models. The classifier model can be generated or trained (or both) based on training data with labels derived from data in one or more available data sources (e.g., ACRO). In a non-limiting example, labeled training data used to build such a classifier can include 22% simulated data for MDU and 6% simulated data for non-MDU, or other suitable proportions. In some cases, the simulated data is generated by stripping one or more fields from real data. For example, the simulated data can be used to determine that the trained classifier model accurately classifies address data, even when the stripped-off fields are not available (or missing) when the addresses are scored.

The unit-classification system may use some or all of the above features of data sets to build two or more one-class classifiers, such as one-class classifiers using RIPPER (Repeated Incremental Pruning to Produce Error Reduction) or any other suitable machine-learning method. As a non-limiting example, a classifier may be built according to the constraints indicated in Table 1.

TABLE 1

Classifier Constraints

MDU model with 73 rules
NON-MDU model with 33 rules
Classifier can be applied in a waterfall approach
If an Address passes one of MDU model rules
   then it is an "MDU"
Else if it passes one of NON-MDU model rules
   then it is a "NON-MDU"
Else "Unknown"

Continuing with the above example, at least two one-class classifiers can be constructed. A first one-class classifier can recognize MDU. A second one-class classifier can recognize non-MDUs. The first and second one-class classifiers can be combined in a waterfall model to create a three-class classification (e.g., MDU, non-MDU and Unknown). The example unit-classification system may identify, via the waterfall model, both MDU and non-MDU dwellings, and can further identify an "unknown" set that cannot be classified as an MDU or a non-MDU dwelling. This unknown set may be further analyzed to determine an appropriate class (i.e., MDU or non-MDU). An example of classification results is shown in Table 2.

TABLE 2

| Classification | Waterfall Model (MDU, non-MDU, else MDU) |
|---|---|
| MDU | 42% |
| NON-MDU | 47% |
| UNKNOWN | 11% |
| Total addresses | 100% |

Generating a MDU Identification

In some implementations, a unit-classification system can generate an MDU identification ("MDU ID") for a location that includes an MDU. An MDU ID can be generated to identify a location (e.g., building, property) that has at least one MDU present at the location. For example, a building that includes multiple addressed dwellings, such as apartments in an apartment building, can be identified by an MDU ID. In some implementations, the MDU ID is unique, or nearly unique, e.g., unique within a country or other geographical region. In some cases, the MDU ID for a location can indicate the location by at least a portion of an address that is present at the location. For instance, an MDU that includes the addresses 4201 Main St Apt 1, 12345; 4201 Main St Apt 2, 12345; and 4201 Main St Apt 3, 12345 can be identified by an MDU ID such as "4201 MAIN ST 12345" or other suitable portion of the addresses. In addition, the MDU ID for a location can indicate the location by at least a portion of latitude/longitude data that are associated with the location. For instance, an MDU that includes the addresses 4211 Main St, 12345; 4221 Main St, 12345; and 4231 Main St, 12345 can be identified by an MDU ID such as "26.9374-82.6901" or other suitable latitude/longitude data that indicates geographic coordinates of the location.

In some implementations, multiple MDU buildings can be grouped together in an MDU complex, such as multiple apartment buildings that are included in an apartment complex. For convenience, and not by way of limitation, a group of multiple MDUs that are grouped together can be referred to as a super MDU. In some cases, all MDUs within a super MDU can have the same super MDU ID. In addition, the super MDU ID can be based on one or more of latitude/longitude data associated with the super MDU, at least a portion of an address present at the super MDU, or another suitable designation of the super MDU. For example, the super MDU ID may be based on a quantity of primary ranges for addresses present at the location of the super MDU. In addition, the super MDU ID may be based on latitude and longitude, such as a total quantity of units in an MDU at a particular set of geographic coordinates.

An MDU ID (or super MDU ID) can be generated based on an indication from a classification model included in the unit-classification system, such as a three-class classification model employing one or more constraints (e.g., as in Table 1) or a waterfall approach (e.g., as in Table 2). The MDU ID can be generated responsive to the classification model determining that an address is included in an MDU. For example, the classification model can provide an indication that the sample addresses 4201 Main St Apt 1, 12345; 4201 Main St Apt 2, 12345; and 4201 Main St Apt 3, 12345 are each included in an MDU. Responsive to receiving the indication, the unit-classification system can generate one or more of an MDU ID or a super MDU ID for the sample addresses. As a non-limiting example, the sample addresses can receive an MDU ID "4201 MAIN ST 12345" that is associated with a particular building (or other location) that includes the sample addresses. As a further non-limiting example, the sample addresses can receive a super MDU ID "MAIN ST APARTMENTS 12345" that is associated with multiple buildings (or other locations) that includes the sample addresses.

In some aspects, generating a unique MDU ID or super MDU ID can provide an identification for all or nearly all dwellings in a geographic region, including dwellings that are included in MDUs. In some cases, uniquely identifying each dwelling can improve decision-making techniques for expenditures, such as expenditures related to installing new infrastructure (e.g., fiber optic cable, mobile communications radio towers), expenditures related to marketing communications, or other types of expenditures. In addition, uniquely identifying each dwelling can improve detection of fraud, such as improved detection of fictitious addresses (e.g., addresses that do not exist, addresses that do not have a dwelling) used to illegally acquire money, services, or other forms of gain.

Example Process for Identity Component Identification

Figure 3:
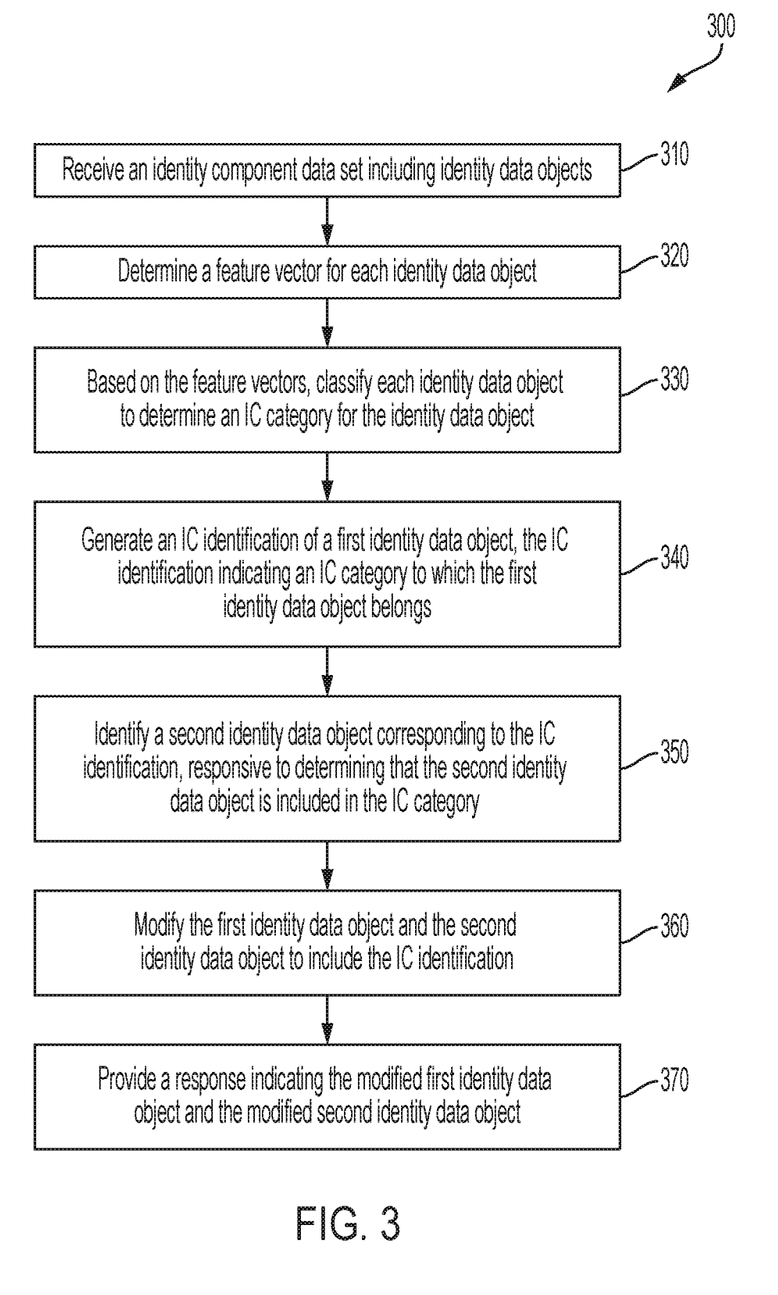
FIG. 3 is a flow chart depicting an example of a process for generating an IC identification for identity data objects, such as address data objects, according to certain implementations.

FIG. 3 is a flow chart depicting an example of a process 300 for generating an IC identification for one or more identity data objects. In some embodiments, such as described in regards to FIGS. 1-2, a computing device executing a unit-classification system implements operations described in FIG. 3, by executing suitable program code. For illustrative purposes, the process 300 is described with reference to the examples depicted in FIGS. 1-2. Other implementations, however, are possible.

At block 310, the process 300 involves receiving an IC data set, such as the IC data set 105. The IC data set is received by a unit-classification system, such as the unit-classification system 120. The IC data set can include one or more identity data objects, such as data objects indicating user ID, account data, telephone number data, or other data describing one or more personal ICs. In a non-limiting example, one or more of the identity data objects can include address data corresponding to respective addressed locations, including addressed residential dwellings, addressed commercial buildings, property lots (e.g., empty lots, unbuilt addresses), or other types of geographic locations. In some cases, the IC data set indicates address data from a data repository (e.g., USPS data, ARCO data, NCTUE data). The IC data set can include one or more of text data, image data, or any other suitable type of data indicating a personal IC.

In some implementations, the IC data set is cleansed, i.e., has one or more types of data removed. For example, a component of the unit-classification system, such as the data reduction module 130, can determine one or more additional data objects to be removed. For instance, the data reduction module 130 could remove an additional data object that includes an error code, or that lacks personal IC data being classified (e.g., user ID data is being classified, and the additional data object does not include any user ID data). The data reduction module can modify the IC data set by removing the additional data objects. As a non-limiting example, the data reduction module can remove from the IC data set additional data objects corresponding to the non-residential locations or having error codes indicating invalid or unknown address information. Although the example unit-classification system is described as having a data reduction module capable of modifying the received IC data set, other implementations are possible. For example, an IC data set could be modified (e.g., cleansed) by an additional computing system, and a unit-classification system could receive an IC data set that is already modified. In some cases, a cleansed IC data set received by a unit-classification system may be additionally modified by the unit-classification system (e.g., removing additional types of data).

At block 320, the process 300 involves determining one or more feature vectors for identity data objects included in the IC data set. In some cases, a feature vector is determined for each respective identity data object in the data set. For instance, a component of the unit-classification system, such as the feature extraction module 140, can determine respective feature vectors for each identity data object in the received (or cleansed) IC data set. For each particular identity data object, the respective feature vector can indicate one or more extracted features of the particular identity data object. Extracted features can be based on the particular identity data object, such as a feature indicating an explicit MDU indicator (e.g., "APT"), or can be based on a group of identity data objects, such as a feature indicating an address pattern (e.g., a group of addresses with similar street numbers). In some implementations, a feature vector can represent extracted features as a vector of data, such as Boolean data indicating a presence (or absence) of a feature, numeric data indicating a value of a feature (e.g., a value indicating address data, a value indicating a relationship among multiple addresses), or any other suitable data type indicating a value in a vector.

At block 330, the process 300 involves classifying one or more identity data objects based on the feature vectors. The classification of a particular identity data object can indicate an IC category that includes the particular identity data object. For example, the unit-classification system can include one or more classifier models, such as the classifier model 150, that are trained to analyze one or more feature vectors. Based on an analysis of a respective feature vector for a particular identity data object, the classifier model can determine a classification for the particular identity data object. In some implementations, the classifier model can include one or more one-class classifiers that can categorize the particular identity data object based on the respective feature vector. The classification of the particular identity data object may be based on output from one or more of the first and second one-class classifiers.

As a non-limiting example, the classification of a particular identity data object can indicate whether the corresponding addressed residential dwelling is included in an MDU. The classifier model could include a first one-class classifier that determines whether the particular identity data object corresponds to an addressed dwelling included in an MDU, based on the respective feature vector. In addition, the classifier model could include a second one-class classifier that determines whether the particular identity data object corresponds to an addressed dwelling that is non-MDU (e.g., a single-family residence). An output from the classifier model could indicate whether the particular identity data is classified as MDU or non-MDU.

At block 340, the process 300 involves generating at least one IC identification for one or more identity data objects. In some cases, the unit-classification system generates an IC identification responsive to a classification of a particular identity data object. The classification can indicate that the particular identity data object is included in an IC category corresponding to the IC identification. As a non-limiting example, the unit-classification system generates a first MDU ID that is associated with a first identity data object with address data corresponding to a first addressed dwelling. The first MDU ID can indicate a first MDU that includes the first address addressed dwelling. For instance, the first MDU ID could indicate a location of the first MDU, a portion of an address for the first MDU, or another suitable identification of the first MDU. In some cases, the unit-classification system generates the first MDU ID to indicate the first MDU, responsive to classifying the first identity data object as being an MDU dwelling.

In some cases, a particular IC identification can be associated with multiple identity data objects, corresponding to multiple personal ICs. The multiple identity data objects can be classified in a particular IC category. At block 350, for example, the process 300 involves identifying an additional identity data object that is classified in the IC category corresponding to the IC identification. The unit-classification system can identify the additional identity data object responsive to determining that the additional identity data object is classified in the IC category corresponding to the IC identification. In some cases, the additional identity data object is identified based on a similarity between features vectors (e.g., a cosine distance, a cosine similarity). For example, the unit-classification system may determine a similarity between respective feature vectors of the particular identity data object and the additional identity data object.

Continuing with the above example, the unit-classification system could identify a second identity data object with address data corresponding to a second addressed dwelling. Responsive to classifying the second identity data object as being an MDU dwelling, the unit-classification system can compare data in the second identity data object to one or more of the first MDU ID or the first identity data object. Based on a similarity between the second identity data object and one or more of the first MDU ID or the first identity data object, the unit-classification system can determine that the first MDU ID is associated with the second identity data object. For example, the unit-classification system could determine a similarity between respective feature vectors of the first and second identity data objects. In addition, the unit-classification system could determine a similarity between the first MDU ID and at least a portion of address data in the second identity data object.

At block 360, the process 300 involves modifying one or more identity data objects based on the particular IC identification. For example, the unit-classification system could modify the particular identity data object and the additional identity data object to include (or otherwise indicate) the particular IC identification. Continuing with the above example, the unit-classification system can modify the first and second identity data objects to include the first MDU ID. In some cases, the unit-classification system modifies the first (or second) identity data object responsive to determining that the first MDU ID is associated with the first (or second) identity data object.

At block 370, the process 300 involves providing one or more modified identity data objects to an additional computing system, such as the requesting system 180. For example, responsive to a request from the additional computing system, the unit-classification system can generate a response that includes (or otherwise indicates) the modified particular and additional identity data objects. In some cases, the response may indicate one or more of an IC category or an IC identification for the modified identity data objects. The response can be provided by the unit-classification system to the additional computing system. Continuing with the above example, the unit-classification system may generate a response, such as the classification response 125, that indicates the modified first identity data object or the modified second identity data object. In addition, the response could indicate one or more of the first MDU ID, or classifications (e.g., MDU dwelling, non-MDU dwelling) for the first and second data objects, or other suitable information. In some implementations, the additional computing system can be configured to perform additional operations based on the response, such as validating an identity component included in an electronic persona, determining whether an electronic persona is synthetic, providing an alert indicating a synthetic electronic persona, or other suitable actions.

In some cases, the unit-classification system may perform operations related to one or more of blocks 310-360 in response to receiving a query from the additional computing system, such as a query requesting classifications of identity data in the IC data set. In addition, the unit-classification system may perform operations related to one of more of blocks 310-360 prior to receiving a query, and may generate a response subsequent to receiving the query. In some implementations, the unit-classification system can generate a response responsive to receiving authentication/authorization information from the additional computing system, such as information indicating that a requesting system is authorized to access the personal IC classifications or IC identifications.

As discussed above, in some aspects, an additional computing system that receives a response from a unit-classification system can be configured to perform additional operations based on the response. For instance, the additional computing system can be used to modify one or more operations of a host system based on the response. Modifying the host system operation can include causing the additional computing system or another computing system to control access to one or more interactive computing environments by a target entity associated with the one or more identity data objects.

For example, the additional computing system can include one or more processing devices that execute instructions providing an interactive computing environment accessible to end-user devices. Examples of the interactive computing environment include a mobile application specific to a particular additional computing system, a web-based application accessible via mobile device, or other computing environments configured to respond to inputs received from or associated with the target entity. In some aspects, the executable instructions for the interactive computing environment can include instructions that provide one or more graphical interfaces. The graphical interfaces are used by an end-user device to access various functions of the interactive computing environment. For instance, the interactive computing environment may transmit data to and receive data from an end-user device to shift between different states of the interactive computing environment, where the different states enable one or more electronic interactions between the end-user device and the additional computing system. If a response from a unit-classification system indicates typical IC categories for the personal identity components for the target entity (e.g., components indicated by an online account), the additional computing system can determine a low probability of potentially fraudulent activity, and the additional computing system can provide an end-user device associated with the target entity with access to a permitted function of the interactive computing environment. Otherwise, if a response from a unit-classification system indicates atypical IC categories, the additional computing system can determine a higher probability of potentially fraudulent activity, and the additional computing system can prevent an end-user device associated with the target entity from accessing a restricted function of the interactive computing environment.

The following discussion involves, for illustrative purposes, a simplified example of an interactive computing environment implemented through an additional computing system to provide access to various online functions. In this example, a user of an end-user device can engage in an electronic transaction with an additional computing system via an interactive computing environment. An electronic transaction between the end-user device and the additional computing system can include, for example, the end-user device being used to query a set of sensitive or other controlled data, access electronic resources (e.g., telecommunication resources) provided via the interactive computing environment, apply for or access a protected resource (e.g., a utility, a subsidized service) of the additional computing system via the interactive computing environment, operating an electronic tool within an interactive computing environment provided by an additional computing system (e.g., a service modification feature, an application-processing feature), or perform some other electronic operation within a computing environment.

For instance, a website or other interactive computing environment can be provided by an additional computing system of a utility provider (e.g., telecommunications provider, water provider, electricity provider). The interactive computing environment can include electronic functions for obtaining one or more utility service modifications, such as an application for utility services, account management tools, service payment functions and transaction management workflows, subsidization request tools, connection/disconnection request tools, or other electronic functions for modifying a utility service. An end-user device can be used to request access to the interactive computing environment provided by the additional computing system, which can selectively grant or deny access to various electronic functions.

Based on the request, the additional computing system can collect, retrieve, or otherwise access one or more identity data objects associated with the customer and provide the one or more identity data objects to a unit-classification system, which can perform one or more operations described above with respect to FIG. 3. The additional computing system can use a response provided by the unit-classification system to instruct another device, such as a web server within the same computing environment as the additional computing system or an independent, third-party computing system in communication with the additional computing system. The instructions can indicate whether to grant the access request of the end-user device to certain features of the interactive computing environment.

For instance, if a response from a unit-classification system indicates a potentially fraudulent activity by a target entity (e.g., a fraudulent request for service connection, an illicit subsidization or refund request), an end-user device used by the target entity can be prevented from accessing certain features of an interactive computing environment. The system controlling the interactive computing environment (e.g., the additional computing system, the web server, the third-party computing system) can prevent, based on the threshold level of risk, the end-user device from advancing a transaction within the interactive computing environment. Preventing the end-user device from advancing the transaction can include, for example, sending a control signal to a web server hosting an online platform, where the control signal instructs the web server to deny access to one or more functions of the interactive computing environment (e.g., functions available to authorized users of the platform).

Example Computing System

Figure 4:
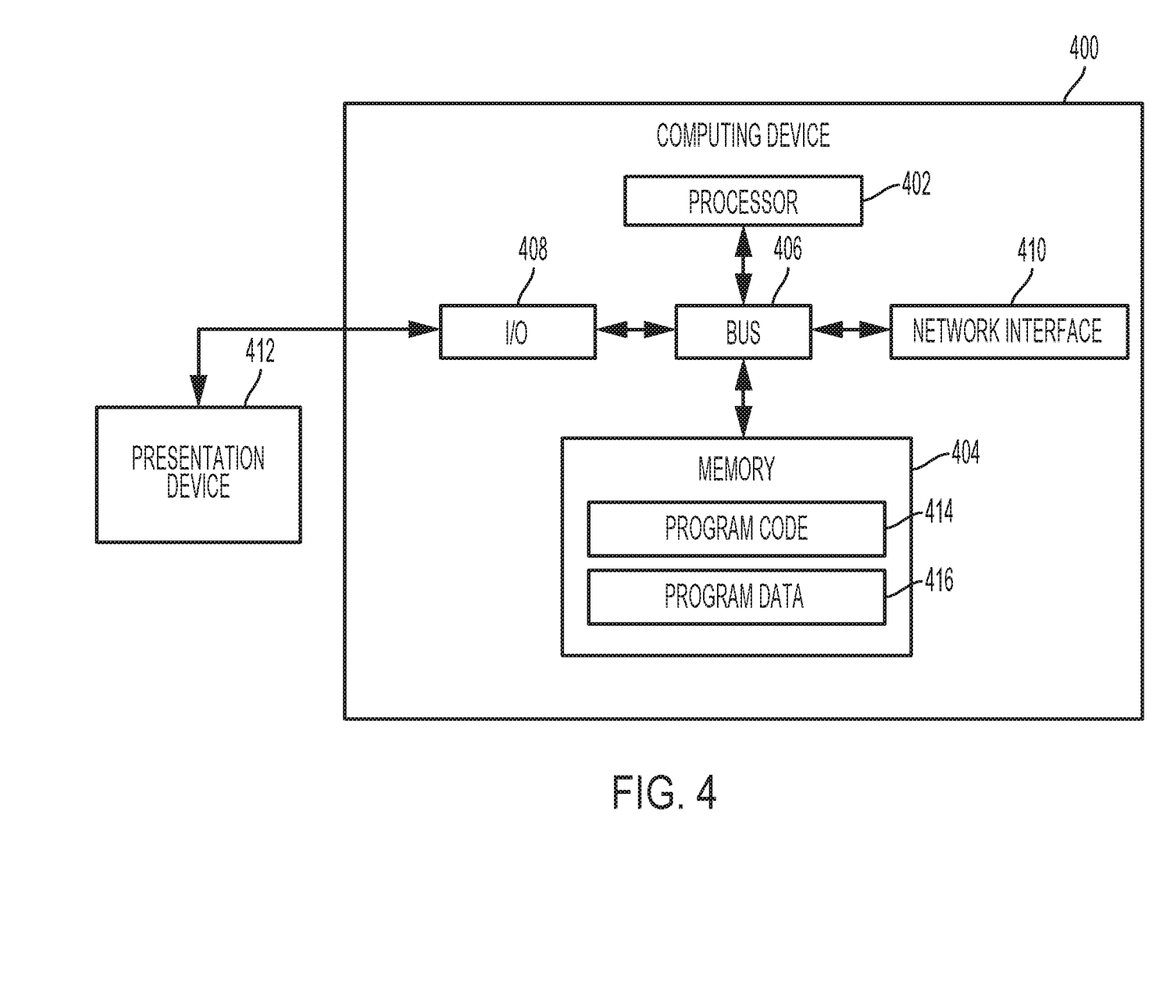
FIG. 4 is a diagram depicting an example of a computing system for implementing a unit-classification system, according to certain implementations.

Any suitable computing system or group of computing systems can be used to perform the operations herein. For example, FIG. 4 is a block diagram depicting an example of a computing device, such as a unit-classification computing device, that can be configured to implement a unit-classification system. The unit-classification computing device can include a processor 402 that is communicatively coupled to a memory 404. The processor 402 executes computer-executable program code stored in the memory 404, accesses information stored in the memory 404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 402 include a microprocessor, an application-specific integrated circuit, a field-programmable gate array, or any other suitable processing device. The processor 402 can include any number of processing devices, including one. The processor 402 can include or communicate with a memory 404. The memory 404 stores program code that, when executed by the processor 402, causes the processor to perform the operations described in this disclosure.

The memory 404 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The unit-classification computing device may also include a number of external or internal devices such as input or output devices. For example, the unit-classification classification computing device is shown with an input/output interface 408 that can receive input from input devices or provide output to output devices. A bus 406 can also be included in the unit-classification system. The bus 406 can communicatively couple one or more components of the unit-classification computing device.

The unit-classification computing device can execute program code that includes the classifier described herein. The program code for the classifier described herein may be resident in any suitable computer-readable medium and may be executed on any suitable processing device. For example, as depicted in FIG. 4, the program code for the classifier described herein can reside in the memory 404 at the unit-classification computing device. Executing the classifier described herein can configure the processor 402 to perform the operations described herein.

In some aspects, the unit-classification computing device can include one or more output devices. One example of an output device is the network interface device 410 depicted in FIG. 4. A network interface device 410 can include any device or group of devices suitable for establishing a wired or wireless data connection to one or more data networks described herein. Non-limiting examples of the network interface device 410 include an Ethernet network adapter, a modem, etc. In some cases, an additional computing system, such as the requesting system 180, may receive data from the computing device 400 via the network interface device 410.

Another example of an output device is the presentation device 412 depicted in FIG. 4. A presentation device 412 can include any device or group of devices suitable for providing visual, auditory, or other suitable sensory output. Non-limiting examples of the presentation device 412 include a touchscreen, a monitor, a speaker, a separate mobile computing device, etc. In some aspects, the presentation device 412 can include a remote client-computing device that communicates with the unit-classification system using one or more data networks described herein. In other aspects, the presentation device 412 can be omitted.

In some aspects, a unit-classification system may be implemented using a data exploration and analytics environment. In one example, a data exploration and analytics environment can integrate multiple exchange data assets (e.g., online account data, IP address data, postal service data, telephone records, etc.) in a common Hadoop repository, a cloud environment or other suitable repository or environment usable for developing analytical models. Data from multiple data assets can be combined based on one or more fields (e.g., at the consumer level, the household level, by geographical address, etc.). Suitable analytical tools (e.g., Hadoop tools such as HIVE, Impala, etc. and/or other analytical tools such as SAS, Alpine Data, etc.) can be used for data exploration, data analysis, and modeling using the combined data.

In some aspects, a data exploration and analytics environment can extract or otherwise obtain data from multiple data sources that store data in a native mainframe format, such as Innovation Access Method ("IAM") format or Virtual Storage Access Method ("VSAM") format. The data exploration and analytics environment can convert the data from the IAM or VSAM formats into Apache Avro or Apache Parquet formats. The IAM/VSAM-to-Avro/Parquet conversion can be performed without converting the IAM or VSAM to an intermediate format, such as comma-separated value files. The data exploration and analytics environment can provide the Avro or Parquet-formatted data to one or more Hadoop-based applications for further data exploration and analysis.

In additional or alternative aspects, a data exploration and analytics environment can obtain a data set that includes personally identifiable information ("PII"), such as social media data or personal data about individuals, and anonymize the data set so that analytics can be generated about the individuals without revealing the identity of the individuals. The data exploration and analytics environment can tokenize the PII so that any PII is replaced with a token that can be used to data in the data set without revealing the identity of any individual associated with the data set. The data exploration and analytics environment can use the data set with the tokenized PII to generate predictive models that provide analytics about one or more individuals associated with the data set. In additional or alternative aspects, the data exploration and analytics environment can use meta-data management tools, such as Adaptive Metadata Manager, that are integrated with a Hadoop-based data-processing framework or other suitable framework such as cloud environment. For example, if data is imported into the data exploration and analytics system from external data sources, the associated metadata from the external sources is integrated into suitable meta-models provided by Hadoop tools such as Hive.

Additional aspects of the present disclosure may be found within the appendix attached hereto and incorporated by reference in its entirety.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Various aspects of the present disclosure can be used for eliminating identity data objects that are not likely to belong to an IC category, identifying partial signals that indicate an identity data object is potentially part of an IC category, identifying additional personal ICs associated with an identity data object, or scoring each identity data object to assess whether the data object belongs to an IC category. In some cases, various aspects of the present disclosure can be used for eliminating addresses that are unlikely to be part of MDU, identifying partial signals that an address is potentially part of an MDU from various databases, geographic address co-ordinates, and/or scoring each address to assess whether the address belongs to an MDU. An algorithm executed by the unit-classification system can be validated on known personal ICs (e.g., known user IDs, known addresses) that belong to a particular IC category.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method that includes one or more processing devices performing operations, the method comprising:
   receiving, by a unit-classification system, an identity component ("IC") data set that includes multiple identity data objects, each one of the multiple identity data objects corresponding to a personal identity component;
   determining, by the unit-classification system, multiple feature vectors of the multiple identity data objects, wherein a respective feature vector for a respective identity data object indicates extracted features of the respective identity data object, the extracted features further including a number pattern feature indicating one or more shared characteristics of a particular group of identity data objects;
   training a machine learning model based on the multiple feature vectors, wherein the training includes:
      generating a waterfall-structure classifier model including a first one-class classifier and a second one-class classifier, wherein the waterfall-structure classifier model is configured to determine, based on each feature vector for each respective identity data object, that the respective identity data object is included in a respective IC category that identifies an inclusion or an exclusion of the respective identity data object in a multi-dwelling unit;
   generating, by the unit-classification system, an IC identification of a first multi-dwelling unit that is included in a first IC category indicated by the first one-class classifier, wherein the IC identification is associated with a first identity data object corresponding to a first personal identity component, and wherein the first IC category represents a group comprising multiple personal identity components;
   identifying, by the unit-classification system and based on a second personal identity component being included in the first IC category, a second identity data object that corresponds to (i) the second personal identity component and (ii) the IC identification of the first multi-dwelling unit;
   modifying, by the unit-classification system, the first identity data object and the second identity data object to include the IC identification of the first multi-dwelling unit; and
   providing, to a requesting computing system and responsive to a request for the IC identification of the first multi-dwelling unit, a response indicating the modified first identity data object and the modified second identity data object, wherein the requesting computing system is configured for verifying an electronic persona based on the response, the verifying including:
      determining that the first IC category in which the second identity data object is included is atypical of the first multi-dwelling unit based on a comparison of a feature of the second identity data object with a feature of the first identity data object, wherein the feature comprises a latitude/longitude feature, and wherein the first data identity object and the second identity data object are associated with the IC identification of the first multi-dwelling unit,
      determining that a particular electronic persona including the second personal identity component is synthetic based on the determination that the first IC category is atypical of the first multi-dwelling unit, and
      restricting access, by a target entity corresponding to the particular electronic persona, to a function of the requesting computing system.

2. The method according to claim 1, wherein the training further includes generating an additional one-class classifier that is configured to determine, based on an additional respective feature vector for an additional respective identity data object, that the additional respective identity data object (i) corresponds to an additional respective personal identity component, and (ii) is included in a second IC category.

3. The method according to claim 1, further comprising:
   identifying, in the IC data set, one or more additional identity data objects that omit data corresponding to the personal identity component; and
   removing the one or more additional identity data objects from the IC data set, prior to the determining the multiple feature vectors of the multiple identity data objects.

4. The method according to claim 1, wherein the multiple identity data objects include one or more of image data, text describing the personal identity component, or a database record.

5. The method according to claim 1, wherein the extracted features further include one or more features indicating one or more shared characteristics of a particular group of identity data objects including address features, postal code features, street features, or, latitude/longitude features.

6. The method according to claim 1, wherein the IC identification includes one of more of, a portion of address data of an addressed residential dwelling, or a combination of latitude data and longitude data corresponding to a location of the first multi-dwelling unit.

7. The method according to claim 1, wherein the IC data set is a labeled training data set that includes, for each respective one of the multiple identity data objects, a respective label indicating whether the respective identity data object is included in a particular IC category,
   wherein the method further comprises:
   prior to the determining the multiple feature vectors of the multiple identity data objects, removing a portion of identity data from each one of the multiple identity data objects; and
   subsequent to providing the response, validating the modified first identity data object against the respective label of the first identity data object and the modified second identity data object against the respective label of the second identity data object.

8. A system for classifying personal identity components, the system comprising:
a unit-classification system having at least one processor and at least one local memory device, wherein the unit-classification system is capable of communicating i) with a requesting computing system via an access interface and a network, and
a machine learning model that is included in the unit-classification system,
wherein the unit-classification system is configured to perform, via the processor, operations comprising:
receiving, via the access interface and from the requesting computing system, a request for IC identification information of an identity component ("IC") data set;
receiving the IC data set, wherein the IC data set includes multiple identity data objects, each one of the multiple identity data objects corresponding to a personal identity component;
determining multiple feature vectors of the multiple identity data objects, wherein a respective feature vector for a respective identity data object indicates extracted features of the respective identity data object, the extracted features further including a number pattern feature indicating one or more shared characteristics of a particular group of identity data objects;
training the machine learning model based on the multiple feature vectors, wherein the training includes:
generating a waterfall-structure classifier model including a first one-class classifier and a second one-class classifier, wherein the waterfall-structure classifier model is configured to determine, based on each feature vector for each respective identity data object, that the respective identity data object is included in a respective IC category that identifies an inclusion or an exclusion of the respective identity data object in a multi-dwelling unit;
generating a first IC identification of a first multi-dwelling unit that is included in a first IC category indicated by the first one-class classifier, wherein the first IC identification is associated with a first identity data object corresponding to a first personal identity component, and wherein the first IC category represents a group comprising multiple personal identity components;
identifying, by the unit-classification system and based on a second personal identity component being included in the first IC category, a second identity data object that corresponds to (i) the second personal identity component and (ii) the IC identification of the first multi-dwelling unit;
modifying, by the unit-classification system, the first identity data object and the second identity data object to include the first IC identification of the first multi-dwelling unit; and
providing, to the requesting computing system and responsive to the request, a response indicating the modified first identity data object and the modified second identity data object, wherein the requesting computing system is configured for verifying an electronic persona based on the response, the verifying including:
determining that the first IC category in which the second identity data object is included is atypical of the first multi-dwelling unit based on a comparison of a feature of the second identity data object with a feature of the first identity data object, wherein the feature comprises a latitude/longitude feature, and wherein the first data identity object and the second identity data object are associated with the IC identification of the first multi-dwelling unit,
determining that a particular electronic persona including the second personal identity component is synthetic based on the determination that the first IC category is atypical of the first multi-dwelling unit, and
restricting access, by a target entity corresponding to the particular electronic persona, to a function of the requesting computing system.

9. The system according to claim 8, wherein the training further includes generating an additional one-class classifier that is configured to determine, based on an additional respective feature vector for an additional respective identity data object, that the additional respective identity data object (i) corresponds to an additional respective personal identity component, and (ii) is included in a second IC category.

10. The system according to claim 8, the operations further comprising:
identifying, in the IC data set, one or more additional identity data objects that omit data corresponding to the personal identity component; and
removing the one or more additional identity data objects from the IC data set, prior to the determining the multiple feature vectors of the multiple identity data objects.

11. The system according to claim 8, wherein the multiple identity data objects include one or more of image data, text describing the personal identity component, or a database record.

12. The system according to claim 8, wherein the extracted features further include one or more of address features, postal code features, street features, or latitude/longitude features.

13. The system according to claim 8, wherein the first IC identification includes one of more of: a portion of address data of an addressed residential dwelling, or a combination of latitude data and longitude data corresponding to a location of the first multi-dwelling unit.

14. The system according to claim 8, wherein the IC data set is a labeled training data set that includes, for each respective one of the multiple identity data objects, a respective label indicating whether the respective identity data object is included in a particular IC category,
wherein the operations further comprise:
prior to the determining the multiple feature vectors of the multiple identity data objects, removing a portion of identity data from each one of the multiple identity data objects; and
subsequent to providing the response, validating the modified first identity data object against the respective label of the first identity data object and the modified second identity data object against the respective label of the second identity data object.

15. A non-transitory computer-readable medium embodying program code for classifying personal identity components, the program code comprising instructions which, when executed by a processor, cause the processor to perform operations comprising:

receiving, by a unit-classification system, an identity component ("IC") data set that includes multiple identity data objects, each one of the multiple identity data objects corresponding to a personal identity component;

determining, by the unit-classification system, multiple feature vectors of the multiple identity data objects, wherein a respective feature vector for a respective identity data object indicates extracted features of the respective identity data object, the extracted features further including a number pattern feature indicating one or more shared characteristics of a particular group of identity data objects;

training a machine learning model based on the multiple feature vectors, wherein the training includes:
generating a waterfall-structure classifier model including a first one-class classifier and a second one-class classifier, wherein the waterfall-structure classifier model is configured to determine, based on each feature vector for each respective identity data object, that the respective identity data object is included in a respective IC category that identifies an inclusion or an exclusion of the respective identity data object in a multi-dwelling unit;

generating, by the unit-classification system, an IC identification of a first multi-dwelling unit that is included in a first IC category indicated by the first one-class classifier, wherein the IC identification is associated with a first identity data object corresponding to a first personal identity component, and wherein the first IC category represents a group comprising multiple personal identity components;

identifying, by the unit-classification system and based on a second personal identity component being included in the first IC category, a second identity data object that corresponds to (i) the second personal identity component and (ii) the IC identification of the first multi-dwelling unit;

modifying, by the unit-classification system, the first identity data object and the second identity data object to include the IC identification of the first multi-dwelling unit; and providing, to a requesting computing system and responsive to a request for the IC identification of the first multi-dwelling unit, a response indicating the modified first identity data object and the modified second identity data object, wherein the requesting computing system is configured for verifying an electronic persona based on the response, the verifying including:
determining that the first IC category in which the second identity data object is included is atypical of the first multi-dwelling unit based on a comparison of a feature of the second identity data object with a feature of the first identity data object, wherein the feature comprises a latitude/longitude feature, and the second identity data object are associated with the IC identification of the first multi-dwelling unit,
determining that a particular electronic persona including the second personal identity component is synthetic based on the determination that the first IC category is atypical of the first multi-dwelling unit, and
restricting access, by a target entity corresponding to the particular electronic persona, to a function of the requesting computing system.

16. The non-transitory computer-readable medium according to claim 15, wherein the training further includes generating an additional one-class classifier that is configured to determine, based on an additional respective feature vector for an additional respective identity data object, that the additional respective identity data object (i) corresponds to an additional respective personal identity component, and (ii) is included in a second IC category.

17. The non-transitory computer-readable medium according to claim 15, further comprising:
identifying, in the IC data set, one or more additional identity data objects that omit data corresponding to the personal identity component; and
removing the one or more additional identity data objects from the IC data set, prior to the determining the multiple feature vectors of the multiple identity data objects.

18. The non-transitory computer-readable medium according to claim 15, wherein the multiple identity data objects include one or more of image data, text describing the personal identity component, or a database record.

19. The non-transitory computer-readable medium according to claim 15, wherein the IC identification includes one of more of: a portion of address data of an addressed residential dwelling, or a combination of latitude data and longitude data corresponding to a location of the first multi-dwelling unit.

20. The non-transitory computer-readable medium according to claim 15, wherein the IC data set is a labeled training data set that includes, for each respective one of the multiple identity data objects, a respective label indicating whether the respective identity data object is included in a particular IC category,
wherein the operations further comprise:
prior to the determining the multiple feature vectors of the multiple identity data objects, removing a portion of identity data from each one of the multiple identity data objects; and
subsequent to providing the response, validating the modified first identity data object against the respective label of the first identity data object and the modified second identity data object against the respective label of the second identity data object.

* * * * *